April 14, 1936.  E. C. HOLDEN  2,037,685
DEHYDRATION AND PURIFICATION OF $CO_2$ GAS
Filed May 6, 1930
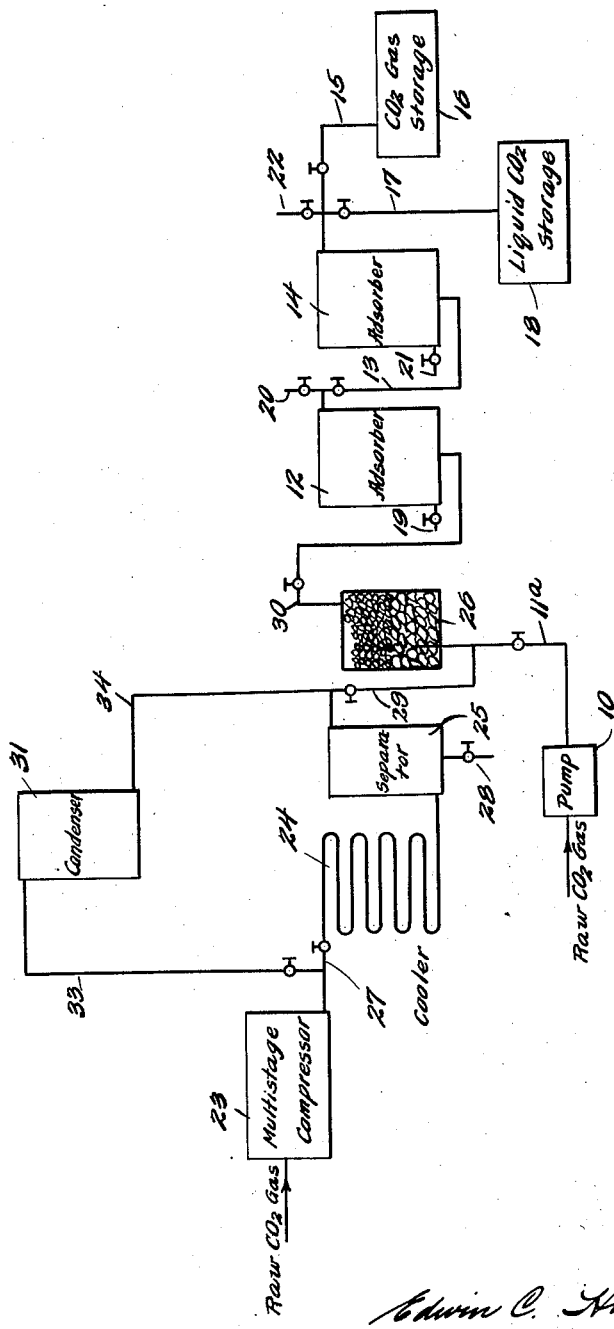

Patented Apr. 14, 1936

2,037,685

UNITED STATES PATENT OFFICE 2,037,685

DEHYDRATION AND PURIFICATION OF $CO_2$ GAS

Edwin C. Holden, Baltimore, Md., assignor, by mesne assignments, to The Davison Chemical Corporation, Baltimore, Md., a corporation of Maryland Application May 6, 1930, Serial No. 450,290

5 Claims. (Cl. 23—150)

The present invention relates to processes of purifying carbon dioxide gas, and more particuly to treating such a gas containing impurities including water vapor and organic compounds.

In the fermentation of many different materials, as, for example, molasses, grains of all kinds, and potatoes, for the purpose of obtaining alcohol, carbon dioxide gas is produced in considerable quantities. This gas, even after it has been scrubbed to remove alcohol, still contains a number of impurities, such as water vapor and odoriferous organic compounds, the chemical composition of which is not well understood.

Likewise carbon dioxide produced by the combustion of coke or other carbonaceous materials, even after the removal of by-products and certain impurities by standard processes, still contains water vapor and other impurities. If the gas is compressed, additional impurities may come from the compressor lubricant, etc.

The presence of these impurities in the carbon dioxide gas obtained from either of these sources must be removed if the gas is to be used commercially, for example, as dry ice or to carbonate beverages.

The principal object of the present invention is to provide a practical process for purifying the carbon dioxide gas whereby such impurities as water vapor and odoriferous organic compounds are completely and effectively removed.

Briefly stated, the process, according to the present invention, consists in passing the scrubbed carbon dioxide gas containing the water vapor and odoriferous organic compounds through one or more masses of solid adsorbing material.

The single figure of the drawing illustrates diagrammatically apparatus for carrying out the process of the present invention.

The treatment of the gas, according to the present invention, may be carried out in any one of three phases, as follows: gaseous phase at normal pressure, gaseous phase at elevated pressure, and liquid phase at pressure sufficient to maintain the gas in the liquid state.

In the process where the gas is maintained at an elevated pressure, the gas containing the water vapor and odoriferous organic compounds obtained from fermentation in the production of alcohol, after scrubbing, is compressed by compressor 23 to the desired pressure and cooled to such a temperature as to liquefy only the water vapor and the organic compounds capable of being liquefied with, or dissolved in, the water at the particular pressure and temperature. The temperature should be higher or the pressure lower than the liquefaction point of carbon dioxide gas, which is 88.6° F. at atmospheric pressure. Preferably, a pressure of 800 to 1500 pounds per square inch at a temperature of 95° F. is sufficient to compress the carbon dioxide gas.

The compressed gas is discharged into pipe 27 and flows through the cooler 24, but the gas is not cooled sufficiently to condense any of the $CO_2$. From the cooler the gas flows through a separator 25, in which the condensed organic compounds and water separate out from the compressed gas mixture and may be discharged from time to time through the drain 28. The gas then flows through pipe 29 into filtering chamber 26 containing a bottom layer of quartz and an upper layer of silica gel. In its passage through these materials, the gas mixture is relieved of any entrained water and condensed organic compounds, also any other condensed impurities such as lubricant from the compressor.

From the filter 26, the gas mixture is passed through one or more adsorbers in series containing a solid, porous, adsorbing material. As shown, there are two adsorbers, and the gas passes from the filter 26 by means of pipe 30 to the first adsorber 12, thence by pipe 13 to the second adsorber 14, and thence by pipe 15 to the storage tank 16.

The adsorbing material may be a hard, porous gel, such as silica gel, tungstic oxide gel, aluminum oxide gel, stannic oxide gel, a gel impregnated so as to give it a carbon surface, or an adsorbent such as activated charcoal.

Usually it is preferred to employ a material like silica gel in the first adsorber 12 and a carbon impregnated gel or activated charcoal in the last adsorber of the series, indicated by 14. The adsorbers containing the silica gel or like material remove the water vapor and a large portion of the other impurities from the mixture, and the adsorbers containing the carbon impregnated gel or activated charcoal recover the remaining organic compounds and like substances.

Although it is preferred to have one or more of the adsorbers contain a gel like silica gel, and one or more of the remaining adsorbers of the series contain activated charcoal, or a carbon impregnated gel, it is to be understood that a gel such as silica gel may be used in all of the adsorbers. Furthermore, although it is preferred to have the silica gel in the first adsorbers and the activated charcoal or carbon impregnated gel in the last adsorbers, nevertheless, the system will be operative if some other order is taken.

When the silica gel or like gel becomes charged with impurities to such an extent that it is not acting with the desired efficiency, it is revivified or reactivated, preferably by introducing hot gases into the adsorber through the inlet 19. The exit for these gases and substances driven out of the gel is indicated at 20. If preferred, steam may be used as the activating medium.

If the adsorber is charged with charcoal, say like the adsorber 14, then preferably it is activated, first, by passing steam through the same and then a current of dry, purified, heated carbon dioxide gas, followed thereafter by dry, purified carbon dioxide gas at normal temperature, to cool the adsorbent mass, the carbon dioxide gas being taken from the storage tank 16. These activating mediums may be introduced through the inlet 21 and discharged at 22. Of course, the adsorbent masses in the other adsorbers may be activated in the same way, if desired.

When the raw carbon dioxide gas is to be treated at normal pressure, the gas, after scrubbing, is caused to flow through the apparatus by means such as the pump 10. From the pump 10, the gas is discharged through pipe 11a into the filtering chamber 26 and thereafter is treated in the same manner as the compressed gas previously described.

When the process is to be carried out with the gas in the liquid phase, the carbon dioxide gas obtained from the sources already mentioned, after scrubbing, is compressed by compressor 23 and cooled so that it will condense in the condenser 31, the compressor being connected with the condenser by a pipe 33. The liquid carbon dioxide with impurities therein is then conveyed by pipes 34 and 29 to the filter 26, and then to the adsorbers 12 and 14 and, after passage through the same, is discharged through pipe 17 to a liquid storage tank 18. The treatment in the adsorbers is the same as previously described. In its passage through the apparatus, the liquefied gas is maintained under such pressure as to keep it in the liquid state.

Although the processes have been described in connection with the purification of carbon dioxide obtained from fermentation in the production of alcohol and from combustion gases, it is to be understood that it is effective to purify carbon dioxide containing impurities, such as water vapor and organic compounds, regardless of the sources of the supply.

It will be understood that valves are provided as required to control the proper flow of the fluids.

Having thus described the invention, what is claimed as new and desired to be secured by Letters Patent is:

1. The process of purifying liquid carbon dioxide containing water and odoriferous compounds consisting in passing the liquid carbon dioxide while maintaining it in the liquid state through an adsorbing material capable of adsorbing water in preference to odoriferous compounds to extract the water therefrom, and separately through an adsorbing material capable of adsorbing odoriferous compounds to extract the organic compounds therefrom.

2. The process according to claim 1 wherein the adsorbing material capable of adsorbing water in preference to odoriferous compounds is a gel.

3. The process according to claim 1 wherein the adsorbing material capable of adsorbing water in preference to odoriferous compounds is silica gel, and that capable of adsorbing odoriferous compounds is activated carbon.

4. The process according to claim 1 wherein the liquid carbon dioxide treated is that derived from fermentation in the production of alcohol.

5. The process of purifying liquid carbon dioxide containing water and odoriferous compounds consisting in passing the liquid carbon dioxide while maintaining it in the liquid state through an adsorbing material capable of adsorbing water in preference to odoriferous compounds to extract the water therefrom, then through a separate adsorbing material capable of adsorbing odoriferous compounds to extract the latter therefrom, and activating the adsorbents after use including the step of passing purified carbon dioxide gas through the second adsorbing material after the activation to cool the same.

EDWIN C. HOLDEN.